United States Patent
Wu et al.

(10) Patent No.: US 9,203,660 B2
(45) Date of Patent: Dec. 1, 2015

(54) METHOD OF DESIGNING CODEBOOK FOR 3D ANTENNA CONFIGURATION

(75) Inventors: Lu Wu, Shanghai (CN); Hongwei Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/239,066

(22) PCT Filed: Aug. 14, 2012

(86) PCT No.: PCT/IB2012/001890
§ 371 (c)(1),
(2), (4) Date: Feb. 14, 2014

(87) PCT Pub. No.: WO2013/024351
PCT Pub. Date: Feb. 21, 2013

(65) Prior Publication Data
US 2014/0177749 A1    Jun. 26, 2014

(30) Foreign Application Priority Data

Aug. 15, 2011  (CN) .......................... 2011 1 0233465

(51) Int. Cl.
*H04B 7/02* (2006.01)
*H04L 25/03* (2006.01)
(Continued)

(52) U.S. Cl.
CPC .......... *H04L 25/0391* (2013.01); *H04B 7/0469* (2013.01); *H04B 7/0617* (2013.01); *H04L 25/03923* (2013.01); *H04B 7/0639* (2013.01)

(58) Field of Classification Search
CPC .. H04B 7/0639; H04B 7/0417; H04B 7/0617; H04B 7/0478; H04B 7/0634; H04B 7/0482; H04B 7/0486; H04B 7/0469; H04W 16/28; H04W 24/02; H04L 25/0391; H04L 25/03923

USPC ......... 375/260, 267, 219, 257, 295, 316, 329, 375/340; 370/252, 321, 329, 431
See application file for complete search history.

(56) References Cited

U.S. PATENT DOCUMENTS 8,055,192 B2 * 11/2011 Park et al. ........................ 455/39
8,391,925 B2 *  3/2013 Khojastepour ............ 455/562.1
(Continued)

FOREIGN PATENT DOCUMENTS

CN    101867461 A    10/2010
CN    101931443 A    12/2010
(Continued)

OTHER PUBLICATIONS

Alcatel-Lucent Shanghai Bell et al., "Considerations on CSI feedback enhancements for high-priority antenna configurations," $3^{rd}$ Generation Partnership Project (3GPP), 3GPP TSG-RAN WG1 #66, R1-112420, 7 pages, Athens, Greece, Aug. 22-26, 2011.
(Continued)

*Primary Examiner* — Dhaval Patel
(74) *Attorney, Agent, or Firm* — Fay Sharpe LLP

(57) ABSTRACT

The invention relates to a method of designing a codebook for a 3D antenna configuration, the method including the steps of: selecting a first codeword characterizing a first antenna array in the 3D antenna configuration from a first codebook; selecting a second codeword characterizing a second antenna array in the 3D antenna configuration from a second codebook; and obtaining a corresponding codeword in the codebook for the 3D antenna configuration by multiplying the first codeword with the second codeword. The solution of the invention has the advantage of being simple in design and can make use of existing LTE Rel-10 codebooks and thus have the advantage of good compatibility.

20 Claims, 3 Drawing Sheets

(51) Int. Cl.
*H04B 7/04* (2006.01)
*H04B 7/06* (2006.01)

(56) References Cited

U.S. PATENT DOCUMENTS

| | | | |
|---|---|---|---|
| 8,483,324 B2* | 7/2013 | Arar | 375/340 |
| 2004/0048635 A1 | 3/2004 | Goldberg | |
| 2008/0242243 A1 | 10/2008 | Kikuchi | |
| 2009/0167605 A1* | 7/2009 | Haskell | 342/372 |
| 2009/0232245 A1* | 9/2009 | Lakkis | 375/267 |
| 2011/0170427 A1 | 7/2011 | Koivisto et al. | |
| 2011/0268207 A1* | 11/2011 | Choi et al. | 375/267 |
| 2012/0307648 A1 | 12/2012 | Okubo et al. | |
| 2012/0328031 A1* | 12/2012 | Pajukoski et al. | 375/259 |

FOREIGN PATENT DOCUMENTS

| | | | |
|---|---|---|---|
| JP | 2005538614 A | 12/2005 | |
| JP | 2006115451 A | 4/2006 | |
| JP | 2006135426 A | 5/2006 | |
| JP | 2008500777 A | 1/2008 | |
| WO | 2005120096 A2 | 12/2005 | |
| WO | 2011005048 A2 | 1/2011 | |
| WO | 2011083805 A1 | 7/2011 | |

OTHER PUBLICATIONS

International Search Report for PCT/IB2012/001890 dated Jan. 31, 2013.
English Bibliography for Chinese Patent Application Publication No. CN101931443A, published Dec. 29, 2010, printed from Thomson Innovation on May 7, 2015, 3 pp.
English Bibliography for Japanese Patent Application Publication No. JP2005538614A, published Dec. 15, 2005, printed from Thomson Innovation on May 7, 2015, 4 pp.
English Bibliography for Japanese Patent Application Publication No. JP2006115451A, published Apr. 27, 2006, printed from Thomson Innovation on May 7, 2015, 3 pp.
English Bibliography for Japanese Patent Application Publication No. JP2006135426A, published May 25, 2006, printed from Thomson Innovation on May 7, 2015, 3 pp.
English Bibliography for Japanese Patent Application Publication No. JP2008500777A, published Jan. 10, 2008, printed from Thomson Innovation on May 7, 2015, 4 pp.
English Bibliography for PCT Patent Application Publication No. WO2011083805A1, published Jul. 14, 2011, printed from Thomson Innovation on May 7, 2015, 3 pp.
R1-103335, Rel-10 codebook design issues for downlink MIMO, 3GPP TSG RAN WG1, Meeting #61, May 10-14, 2010, Montreal, Canada, 5 pp.
R1-111434, Real-Life Scenarios for Downlink MIMO Enhancement, 3GPP TSG RAN WG1 Meeting #65, May 9-13, 2011, Barcelona, Spain, 4 pp.
R1-112515, Prioritization of CSI feedback enhancement scenarios for DL-MIMO, 3GPP TSG RAN WG1, Meeting #66, Aug. 22-26, 2011, Athens, Greece, 3 pp.
IEEE Std. 802.15.3c-2009, IEEE Standard for Information technology—telecommunications and information exchange between systems—local and metropolitan area networks—specific requirements, Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension, Oct. 12, 2009, pp. i-xiii; pp. 1-187.
PCT Pat. App. No. PCT/IB2012/001890, Written Opinion of the International Searching Authority, mailed Jan. 31, 2013, 5 pp.
European Patent No. 12823391, Extended European Search Report, mailed Apr. 22, 2015, 6 pp.

\* cited by examiner

METHOD OF DESIGNING CODEBOOK FOR 3D ANTENNA CONFIGURATION

FIELD OF THE INVENTION

The present disclosure relates to the wireless communication and particularly to a method of designing a codebook for a 3D antenna configuration.

BACKGROUND OF THE INVENTION

The current LTE-A standard defines 2D channel modeling and 2D antenna configurations, which means that only horizontal azimuth angles of departure and arrival but no angles in the vertical direction are considered.

Recently 3D channel modeling is attracting more and more attention, since it provides additional performance gain in the vertical direction in addition to the gain in the horizontal direction. In 3D channel modeling, a 3D antenna configuration is required to provide both horizontal coverage and vertical coverage. A typical application of the 3D antenna configuration is for the coverage of an urban environment with high densities of high buildings. Here a 3D antenna configuration refers to an antenna configuration in which a 3D beam can be generated.

In a Frequency Division Duplex (FDD) system, a user equipment selects the best codeword in a predefined codebook representing the downlink Channel State Information (CSI) and feeds a Pre-coding Matrix Index (PMI) corresponding to the codeword back to a base station (eNodeB). The existing standard Rel-10 has offered codebooks for a 2D antenna configuration, but a design of codebooks for a 3D antenna configuration has been absent so far.

SUMMARY OF THE INVENTION

An object of the invention is to propose a method of designing a codebook for a 3D antenna configuration in a simple design, which will be very advantageous.

According to one aspect of the invention, there is provided a method of designing a codebook for a 3D antenna configuration, the method comprising the steps of: selecting a first codeword characterizing a first antenna array in the 3D antenna configuration from a first codebook; selecting a second codeword characterizing a second antenna array in the 3D antenna configuration from a second codebook; and obtaining a corresponding codeword in the codebook for the 3D antenna configuration by multiplying the first codeword with the second codeword.

Here the 3D antenna configuration is an antenna configuration generating a 3D beam.

Furthermore the 3D antenna configuration is a rectangular antenna array; and the first codebook is a horizontal codebook, and the second codebook is a vertical codebook; and the first codeword characterizes a horizontal linear antenna array in the rectangular antenna array, and the second codeword characterizes a vertical linear antenna array in the rectangular antenna array.

According another aspect of the invention, there is proposed a method of determining a codeword in a base station of a communication system with a 3D antenna configuration, the base station being configured with a rectangular antenna array, and the method comprising the steps of: receiving information about a first index n of a first codeword in a first codebook, information about a second index m of a second codeword in a second codebook and information about a rank r from a user equipment; determining a target codeword corresponding to the received first index n, the second index m and the rank r, for the rank $1 \leq r \leq N_V$, the target codeword being represented as:

$$W_{mN+n}^{(r)} = T_{m,n}^{r} / \|T_{m,n}^{r}\|;$$

$$T_{m,n}^{r}(:,k) = \operatorname{col}(U_n^{(r)}(:,k) \cdot (V_m^{(1)})^T),$$

k=1, 2, ..., r; and
m=0, 1, ..., $2^M-1$;
n=0, 1, ..., $2^N-1$;

for the rank $N_V < r \leq N_V N_H$, the target codeword being represented as:

$$W_{mN+n}^{(r)} = F_{m,n}^{N\lceil r/N_V\rceil}(:,1:r) / \|F_{m,n}^{N\lceil r/N_V\rceil}(:,1:r)\|;$$

$$F_{m,n}^{N\lceil r/N_V\rceil}(:,N_V(k_1-1)+k_2) = \operatorname{col}(U_n^{(N_V)}(:,k_2) \cdot (V_m^{(\lceil r/N_V\rceil)}(:,k_1))^T),$$

$k_1$=1, 2, ..., $\lceil r/N_V \rceil$;
$k_2$=1, 2, ..., $N_V$;
m=0, 1, ..., $2^M-1$;
n=0, 1, ..., $2^N-1$, wherein $U_m^{(r)}$ and $V_m^{(r)}$ represent the first codeword and the second codeword with the index m at the rank r respectively, $N_H$ represents an amount of the horizontal linear antenna arrays, $N_V$ represents an amount of the vertical linear antenna arrays, a size of the horizontal codebook is N bits, a size of the vertical codebook is M bits, col(A) represents a transformation of a matrix A into a column vector, A(:,k) represents the $k^{th}$ column of the matrix A, $T_{m,n}^{r}$ is a $N_H N_V \times r$ matrix, and $F_{m,n}^{r}$ is a $N_H N_V \times r$ matrix.

According to another aspect of the invention, there is proposes a method, in a user equipment of a communication system with a 3D antenna configuration, of providing a base station with codeword index information, the base station being configured with a rectangular antenna array, and the method comprising the step of: transmitting information about a first index n of a first codeword in a first codebook, information about a second index m of a second codeword in a second codebook and information about a rank r to the base station according to a predetermined criterion, wherein the first codeword characterizes a first antenna array in the 3D antenna configuration, and the second codeword characterizes a second antenna array in the 3D antenna configuration.

The solution of the invention has the advantage of being simple in design and can make use of existing LTE Rel-10 codebooks and thus have the advantage of good compatibility.

BRIEF DESCRIPTION OF DRAWINGS

Other features, objects and advantages of the invention will become more apparent upon review of the following detailed description of non-limiting embodiments taken with reference to the drawings in which.

DETAILED DESCRIPTION OF EMBODIMENTS

Embodiments of the invention will be described below in details with reference to the drawings.

A rectangular antenna array is a typical 3D antenna configuration in which a 3D beam can be generated. A method of the invention will be set forth in the following description in connection with a rectangular antenna array.

For a geographically localized rectangular antenna array, each row antenna array has a similar spatial direction, and each column antenna array also has a similar spatial direction. This means that for each row/column antenna array, the same codeword could be used to quantize corresponding horizontal/vertical channel state information. The horizontal codebook characterizes the row antenna array, and the vertical codebook characterizes the column antenna array. The horizontal codebook and a vertical codebook can be newly designed codebooks or codebooks composed of a part or all of codewords in an existing Rel-10 codebook, since the Rel-10 codebook is designed for such a row/column antenna array.

If both a horizontal codebook and a vertical codebook are composed of a part or all of codewords in an existing Rel-10 codebook, then different codebook subset restrictions could be done for various antenna types, such as a co-polarized antennas and a cross-polarized antenna. That's because only a part of the codewords may be suitable for the different antenna types. Since an existing Rel-10 codebook can be adopted, the method of designing a codebook for a 3D antenna configuration proposed in this invention has the advantage of good compatibility.

Figure 1:
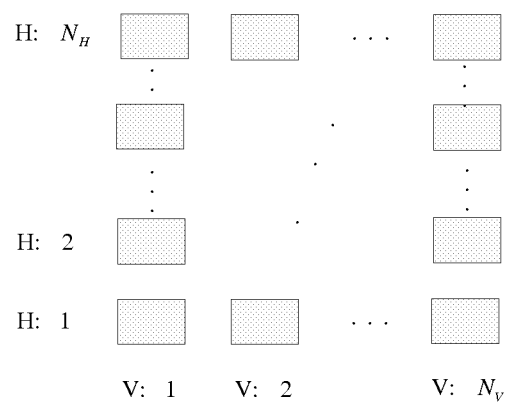
FIG. 1 illustrates a rectangular antenna array deployed at a base station.

FIG. 1 illustrates a rectangular antenna array deployed at a base station. As illustrated, the rectangular antenna array in FIG. 1 is composed of $N_H$ horizontal linear arrays and $N_V$ vertical linear arrays, and the total number of antennas is $N_H \times N_V$. In the current LTE-A standard, $N_H=1$, and in the invention, $N_H>1$ for a 3D antenna configuration, for example, $N_H=5$ and $N_V=4$.

Figure 2:
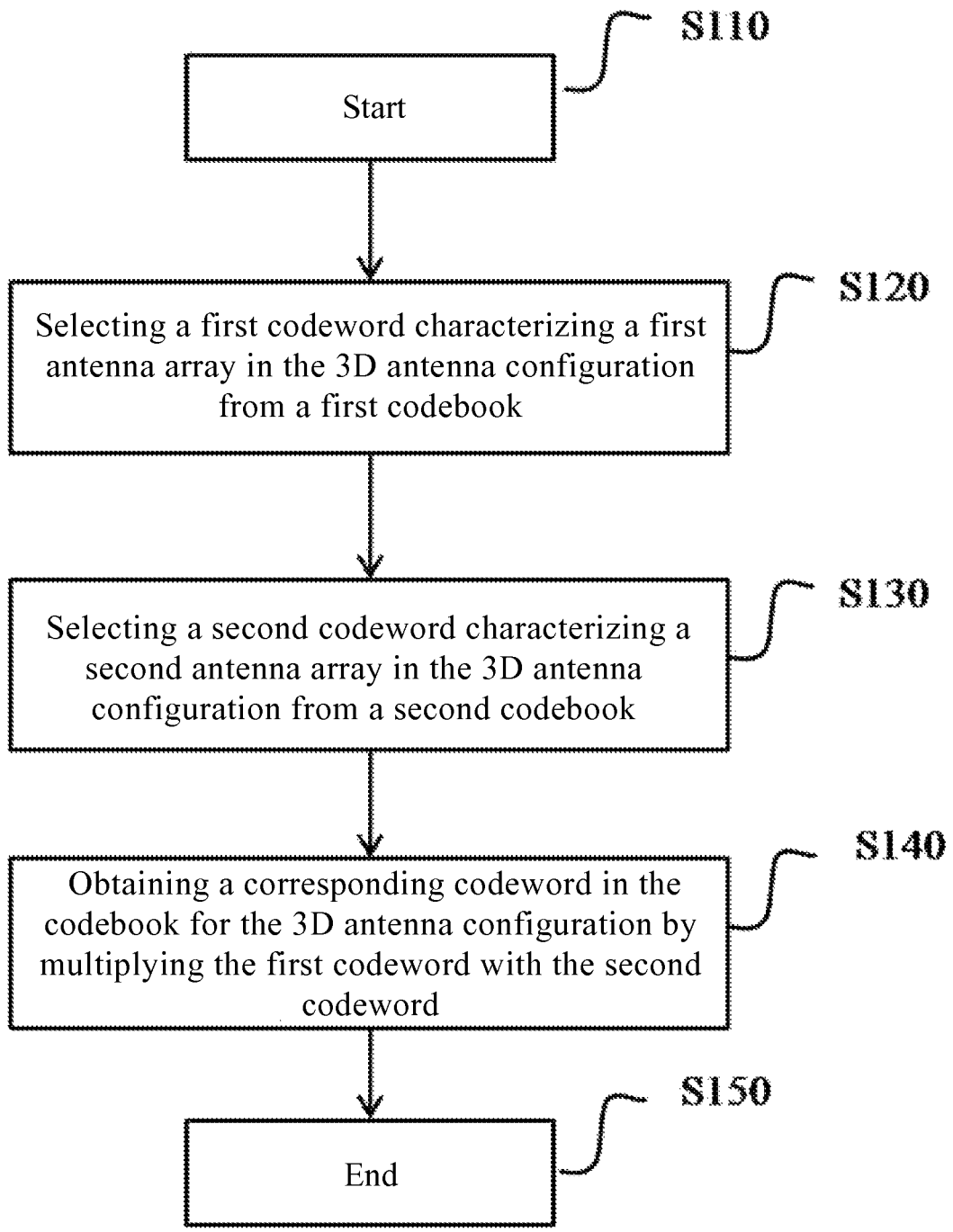
FIG. 2 illustrates a flow chart of a method of designing a codebook for a 3D antenna configuration according to an embodiment of the invention.

FIG. 2 illustrates a flow chart of a method of designing a codebook for a 3D antenna configuration according to an embodiment of the invention. The method of the invention will be illustratively described below in detail with reference to FIG. 2.

This method starts with the step S110, and in the step S120, a first codeword characterizing a first antenna array in the 3D antenna configuration is selected from a first codebook. In the step S130, a second codeword characterizing a second antenna array in the 3D antenna configuration is selected from a second codebook.

In the present embodiment, the 3D antenna configuration adopts the rectangular antenna array illustrated in FIG. 1. The first codebook is a horizontal codebook characterizing a row antenna array, and the second codebook is a vertical codebook characterizing a column antenna array. Thus in the step S120, particularly a horizontal codeword characterizing a horizontal linear antenna array in the rectangular antenna array is selected from the horizontal codebook as the first codeword; and a vertical codeword characterizing a vertical linear antenna array in the rectangular antenna array is selected from the vertical codebook as the second codeword.

In the step S140, the first codeword is multiplied with the second codeword to obtain a corresponding codeword in the codebook for the 3D antenna configuration. The method ends in the step S150.

Particularly the first codeword is multiplied with the second codeword according to a predetermined rule which will be described below in details.

Let $U_m^{(r)}$ and $V_m^{(r)}$ represent a horizontal codeword and a vertical codeword with an index m at the rank-r respectively. The sizes of the horizontal codebook and the vertical codebook are N bits and M bits respectively, and their codewords are typically unitary matrixes, that is, respective columns are orthogonal to each other.

For the rank 1, by the multiplication of horizontal codeword and vertical codeword, the 3D codeword for all antennas could be easily derived.

For a higher rank, each column of a 3D codeword can be obtained by multiplying certain columns of a horizontal codeword with a vertical codeword. Since an angle spread is much larger in a horizontal plane than in a vertical plane, the direction of a primary beam is preferably selected to be in the horizontal plane. For rank $1 \leq r \leq N_V$, a 3D codeword is built from a horizontal codebook at the rank r and a vertical codebook at the rank 1. Particularly a 3D codeword with the index (mN+n) at the rank r can be obtained as below using a vertical codeword with an index of m at the rank 1 and a horizontal codeword with an index of n at the rank r:

$$W_{mN+n}^{(r)} = T_{m,n}^r / \|T_{m,n}^r\|;$$

$$T_{m,n}(:,k) = \mathrm{col}(U_n^{(r)}(:,k) \cdot (V_m^{(1)})^T), \quad (1)$$

k=1, 2, . . . , r;
m=0, 1, . . . , $2^M$–1;
n=0, 1, . . . , $2^N$–1;

Where col(A) represents a transformation of a matrix A into a column vector, and A(:,k) represents the $k^{th}$ column of the matrix A. $T_{m,n}^r$ is a $N_H N_V \times r$ matrix.

For rank $N_V < r \leq N_H$, a horizontal codebook at the rank $N_V$ is used since the number of horizontal antennas is $N_V$. To obtain another rank (r–$N_V$), higher rank vertical codebook should be used for 3D codebook construction. In the present embodiment, a rank number of vertical codebook is selected as $\lceil r/N_V \rceil$, since the direction of a primary beam is selected to be in a horizontal plane.

A 3D codeword with the index (mN+n) at the rank r can be obtained in the following equation using a vertical codeword with an index of m at the rank $\lceil r/N_V \rceil$ and a horizontal codebook with an index of n at the rank $N_V$:

$$W_{mN+n}^{(r)} = T_{m,n}^{N_V \lceil r/N_V \rceil}(:,1:r) / \|T_{m,n}^{N_V \lceil r/N_V \rceil}(:,1:r)\|;$$

$$T_{m,n}^{N_V \lceil r/N_V \rceil}(:,N_V(k_1-1)+k_2) = \mathrm{col}(U_n^{(N_V)}(:,k_2) \cdot (V_m^{(\lceil r/N_V \rceil)}(:,k_1))^T), \quad (2)$$

$k_1=1, 2, \ldots, \lceil r/N_V \rceil$;
$k_2=1, 2, \ldots, N_V$;
m=0, 1, . . . , $2^M$–1;
n=0, 1, . . . , $2^N$–1

Where $F_{m,n}^r$ is a $N_H N_V \times r$ matrix.

As can be apparent from the foregoing description, the obtained 3D codewords have the attribute of a unitary matrix.

Figure 3:
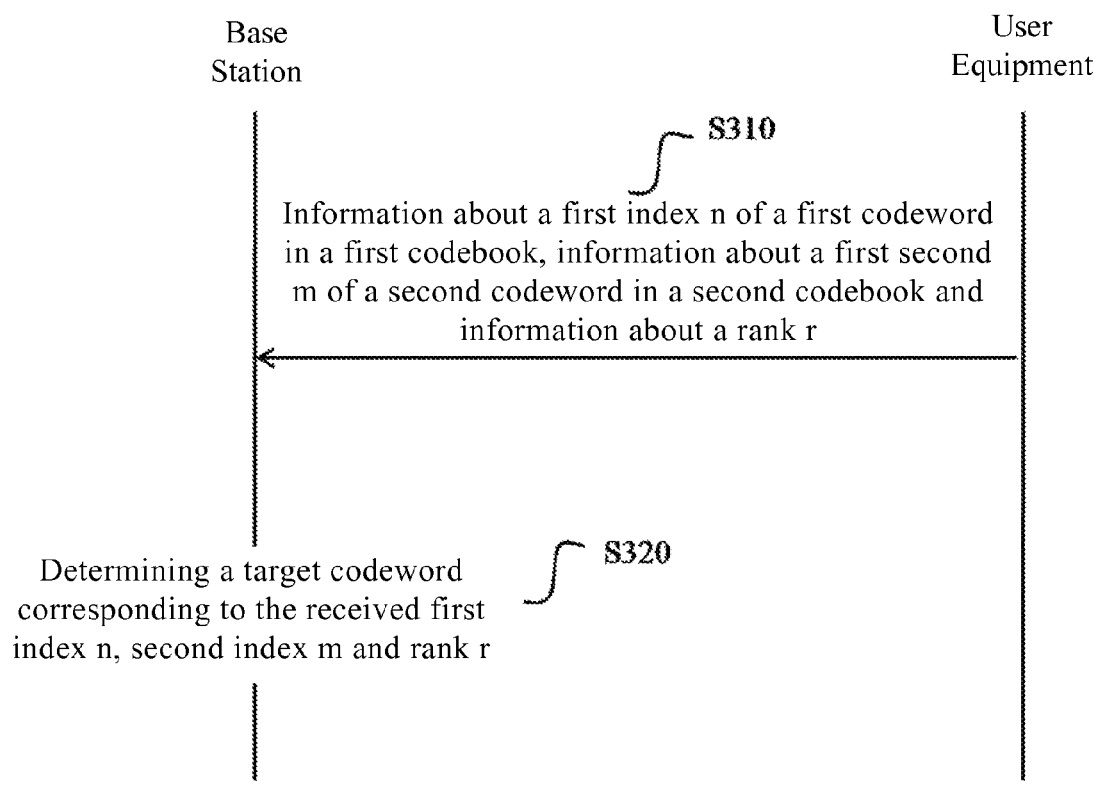
FIG. 3 illustrates a flow chart of a method determining a codeword in a base station and a user equipment of a communication system applying a 3D antenna configuration according to an embodiment of the invention.

FIG. 3 illustrates a flow chart of a method determining a codeword in a base station and a user equipment of a communication system with a 3D antenna configuration according to an embodiment of the invention. In the step S310 of the method, the user equipment transmits information about a first index n of a first codeword in a first codebook, information about a second index m of a second codeword in a second codebook and information about a rank r to the base station according to a predetermined criterion, where the first codeword characterizes a first antenna array in the 3D antenna configuration, and the second codeword characterizes a second antenna array in the 3D antenna configuration. The predetermined criterion is a maximum capacity criterion or another criterion which can occur to those skilled in the art. The base station receives the foregoing information transmitted from the user equipment in the step S310 and determines a target codeword corresponding to the received first index n, second index m and rank r in Equation (1) and Equitation (2) in the step S320.

Those skilled in the art shall appreciate that the foregoing embodiments are illustrative but not limiting. Different technical features appearing in different embodiments can be combined to advantage. Those skilled in the art shall appreciate and implement other variant embodiments of the disclosed embodiments upon reviewing the drawings, the description and the claims. In the claims, the term "comprising" will not preclude another step(s); the indefinite article "a/an" will not preclude plural; and the terms "first", "second", etc., are intended to designate a name but not to represent any specific order. Some technical features appearing in different dependent claims will not indicate that these technical features can not be combined to advantage.

The invention claimed is:

1. A method of designing a codebook for a 3D antenna configuration, the method comprising:
    selecting a horizontal codeword characterizing a first horizontal antenna array in a 3D antenna configuration from a horizontal codebook, wherein the 3D antenna configuration includes a rectangular antenna array formed by one or more horizontal antenna arrays and one or more vertical antenna arrays, wherein the one or more horizontal antenna arrays includes the first horizontal antenna array, wherein the selected horizontal codeword is associated with an index n;
    selecting a vertical codeword characterizing a first vertical antenna array in the 3D antenna configuration from a vertical codebook, wherein the one or more vertical antenna arrays includes the first vertical antenna array, wherein the selected vertical codeword is associated with an index m; and
    determining a target codeword for the 3D antenna configuration based at least in part on the index n associated with the horizontal codeword, the index m associated with the vertical codeword, and a rank r, wherein the rank r is associated with at least one of the horizontal codeword and the vertical codeword.

2. The method of designing a codebook according to claim 1, wherein the 3D antenna configuration is configured to generate a 3D beam.

3. The method of designing a codebook according to claim 1, wherein a direction of a primary beam is selected to be in a horizontal plane.

4. The method of designing a codebook according to claim 1, wherein the horizontal codeword is multiplied with the vertical codeword according to such a predetermined rule that a codeword $W_{mN+n}^{(r)}$ with an index (mN+n) at the rank r in the target codeword for the 3D antenna configuration is represented as:

for the rank $1 \leq r \leq N_V$, $$W_{mN+n}^{(r)} = T_{m,n}^{r} / \|T_{m,n}^{r}\|;$$

$$T_{m,n}^{r}(:,k) = \mathrm{col}(U_n^{(r)}(:,k) \cdot (V_m^{(1)})^T),$$

k=1, 2, ..., r; and
m=0, 1, ..., $2^M-1$;
n=0, 1, ..., $2^N-1$;

for the rank $N_V < r \leq N_V N_H$, $$W_{mN+n}^{(r)} = F_{m,n}^{N_V \lceil r/N_V \rceil}(:,1:r) / \|F_{m,n}^{N_V \lceil r/N_V \rceil}(:,1:r)\|;$$

$$F_{m,n}^{N_V \lceil r/N_V \rceil}(:,N_V(k_1-1)+k_2) = \mathrm{col}(U_n^{(N_V)}(:,k_2) \cdot (V_m^{(\lceil r/N_V \rceil)}(:,k_1))^T),$$

$k_1$=1, 2, ..., $\lceil r/N_V \rceil$;
$k_2$=1, 2, ..., $N_V$;
m=0, 1, ..., $2^M-1$;
n=0, 1, ..., $2^N-1$ wherein, $U_m^{(r)}$ and $V_m^{(r)}$ represent the horizontal codeword and the vertical codeword with the index m at the rank r respectively, $N_H$ represents an amount of the one or more horizontal antenna arrays, $N_V$ represents an amount of the one or more vertical antenna arrays, a size of the horizontal codebook is N bits, a size of the vertical codebook is M bits, col(A) represents a transformation of a matrix A into a column vector, A (:,k) represents a $k^{th}$ column of the matrix A, $T_{m,n}^{r}$ is a $N_H N_V \times r$ matrix, and $F_{m,n}^{r}$ is a $N_H N_V \times r$ matrix.

5. The method of designing a codebook according to claim 1, wherein the horizontal codebook and the vertical codebook include codewords of an existing Rel-10 codebook.

6. The method according to claim 1, wherein the base station is configured to select the horizontal codeword based at least in part on the index n.

7. The method according to claim 6, wherein the base station is configured to select the vertical codeword based at least in part on the index m.

8. The method according to claim 7, wherein the base station is configured to determine a target codeword for the 3D antenna configuration by multiplying the horizontal codeword by the vertical codeword.

9. A method of determining a codeword in a base station of a communication system with a 3D antenna configuration, the method comprising:
    receiving information from a user equipment at a base station with a 3D antenna configuration, wherein the 3D antenna configuration includes a rectangular antenna array formed by one or more horizontal linear antenna arrays and one or more vertical antenna arrays, wherein the received information includes information about a first index n of a first codeword in a horizontal codebook, information about a second index m of a second codeword in a vertical codebook, and information about a rank r, wherein the first codeword characterizes a first horizontal linear antenna array in the rectangular antenna array and the second codeword characterizes a first vertical linear antenna array in the rectangular antenna array;
    determining a target codeword corresponding to the received first index n, the second index m and the rank r,
    for the rank $1 \leq r \leq N_V$, the target codeword being represented as:

$$W_{mN+n}^{(r)} = T_{m,n}^{r} / \|T_{m,n}^{r}\|;$$

$$T_{m,n}^{r}(:,k) = \mathrm{col}(U_n^{(r)}(:,k) \cdot (V_m^{(1)})^T),$$

k=1, 2, ..., r; and
m=0, 1, ..., $2^M-1$;
n=0, 1, ..., $2^N-1$;

for the rank $N_V < r \leq N_V N_H$, the target codeword being represented as:

$$W_{mN+n}^{(r)} = F_{m,n}^{N_V \lceil r/N_V \rceil}(:,1:r) / \|F_{m,n}^{N_V \lceil r/N_V \rceil}(:,1:r)\|;$$

$$F_{m,n}^{N_V \lceil r/N_V \rceil}(:,N_V(k_1-1)+k_2) = \mathrm{col}(U_n^{(N_V)}(:,k_2) \cdot (V_m^{(\lceil r/N_V \rceil)}(:,k_1))^T),$$

$k_1$=1, 2, ..., $\lceil r/N_V \rceil$;
$k_2$=1, 2, ..., $N_V$;
m=0, 1, ..., $2^M-1$;
n=0, 1, ..., $2^N-1$ wherein $U_m^{(r)}$ and $V_m^{(r)}$ represent the first codeword and the second codeword with the index m at the rank r respectively, $N_H$ represents an amount of the one or more horizontal linear antenna arrays, $N_V$ represents an amount of the one or more vertical linear antenna arrays, a size of the horizontal codebook is N bits, a size of the vertical codebook is M bits, col(A) represents a transformation of a matrix A into a column vector, A(:,k)

represents a $k^{th}$ column of the matrix A, $T_{m,n}^{r}$ is a $N_H N_V \times r$ matrix, and $F_{m,n}^{r}$ is a $N_H N_V \times r$ matrix.

10. The method according to claim 9, wherein the 3D antenna configuration is configured to generate a 3D beam.

11. The method according to claim 9, wherein a direction of a primary beam is selected to be in a horizontal plane.

12. The method according to claim 9, wherein the horizontal codebook and the vertical codebook are at least partly composed of codewords in an existing Rel-10 codebook.

13. A method of assisting a base station of a communication system in determining a codeword, the method comprising:
    transmitting information from a user equipment to a base station having a 3D antenna configuration according to predetermined criterion;
    wherein the 3D antenna configuration of the base station includes a rectangular antenna array formed by one or more horizontal antenna arrays and one or more vertical antenna arrays;
    wherein the transmitted information includes an index n of a horizontal codeword, an index m of a vertical codeword, and a rank r associated with at least one of the index n and the index m;
    wherein the horizontal codeword characterizes a first horizontal antenna array in the 3D antenna configuration from a horizontal codebook and the vertical codeword characterizes a first vertical antenna array in the 3D antenna configuration from a vertical codebook;
    wherein the base station is configured to determine a target codeword for the 3D antenna configuration based at least in part on the index n, the index m, and the rank r transmitted by the user equipment.

14. The method according to claim 13, wherein the predetermined criterion is a maximum capacity criterion.

15. The method according to claim 13, wherein, for rank r values in which $1 \leq r \leq N_V$, the target codeword being represented as:

$$W_{mN+n}^{(r)} = T_{m,n}^{r} / \|T_{m,n}^{r}\|;$$

$$T_{m,n}^{r}(:,k) = \mathrm{col}(U_n^{(r)}(:,k) \cdot (V_m^{(1)})^T),$$

k=1, 2, . . . , r; and
m=0, 1, . . . , $2^M$−1;
n=0, 1, . . . , $2^N$−1;

for the rank $N_V < r \leq N_V N_H$, the target codeword being represented as:

$$W_{mN+n}^{(r)} = F_{m,n}^{N_V \lceil r/N_V \rceil}(:,1:r) / \|F_{m,n}^{N_V \lceil r/N_V \rceil}(:,1:r)\|;$$

$$F_{m,n}^{N_V \lceil r/N_V \rceil}(:,N_V(k_1-1)+k_2) = \mathrm{col}(U_n^{(N_V)}(:,k_2) \cdot (V_m^{(\lceil r/N_V \rceil)}(:,k_1))^T),$$

$k_1$=1, 2, . . . , $\lceil r/N_V \rceil$;
$k_2$=1, 2, . . . , $N_V$;
m=0, 1, . . . , $2^M$−1;
n=0, 1, . . . , $2^N$−1 wherein $U_n^{(r)}$ and $V_m^{(r)}$ represent the horizontal codeword and the vertical codeword with the index m at the rank r respectively, $N_H$ represents an amount of the one or more horizontal antenna arrays, $N_V$ represents an amount of the one or more vertical antenna arrays, a size of the horizontal codebook is N bits, a size of the vertical codebook is M bits, col(A) represents a transformation of a matrix A into a column vector, A(:,k) represents a $k^{th}$ column of the matrix A, $T_{m,n}^{r}$ is a $N_H N_V \times r$ matrix, and $F_{m,n}^{r}$ is a $N_H N_V \times r$ matrix.

16. The method of designing a codebook according to claim 13, wherein the 3D antenna configuration is configured to generate a 3D beam.

17. The method of designing a codebook according to claim 13, wherein a direction of a primary beam is selected to be in a horizontal plane.

18. The method according to claim 13, wherein the base station is configured to select the horizontal codeword based at least in part on the index n transmitted by the user equipment.

19. The method according to claim 18, wherein the base station is configured to select the vertical codeword based at least in part on the index m transmitted by the user equipment.

20. The method according to claim 19, wherein the base station is configured to determine a target codeword for the 3D antenna configuration by multiplying the horizontal codeword by the vertical codeword.

* * * * *